United States Patent [19]
Meszaros

[11] 4,166,413
[45] Sep. 4, 1979

[54] BARBECUE

[76] Inventor: Albert Meszaros, 81 Sleepy Hallow Rd., North Tarrytown, N.Y. 10591

[21] Appl. No.: 804,630

[22] Filed: Jun. 8, 1977

[51] Int. Cl.² ............................................. A47J 37/08
[52] U.S. Cl. ................................... 99/393; 126/25 R
[58] Field of Search ............... 242/393, 339, 340, 450, 242/443, 421; 126/25 R, 25 A

[56] References Cited

U.S. PATENT DOCUMENTS

| | | | |
|---|---|---|---|
| 1,853,319 | 4/1932 | Polhemus | 126/25 A |
| 2,541,528 | 2/1951 | McAvoy | 126/25 A |
| 3,016,816 | 1/1962 | Persinger | 126/25 A X |
| 3,182,585 | 5/1965 | Rensch | 99/340 |
| 3,396,716 | 8/1968 | Weyland | 126/25 R |
| 3,438,364 | 4/1969 | Galloway | 126/25 R |
| 3,683,791 | 8/1972 | Rast | 99/340 |

*Primary Examiner*—Edward J. McCarthy
*Attorney, Agent, or Firm*—Howard I. Podell

[57] ABSTRACT

A portable barbecue unit mounted on wheels in the form of a rectangular shaped housing, open to the top, with a grill detachably mounted on a pair of external vertically slidable members that are pivotally mounted to a handle structure extending from an end of the housing. The handle structure is pivotally mounted to the housing through slots in the handle arms so that the grill may be elevated by downward manual pressure on the handle and tilted as desired with respect to the horizontal plane. A slidable tray is mounted beneath a grate in the housing, with the tray serving to catch ashes. A pair of shelf members are slidably mounted to the bottom of the housing to form opposed shelves when each is extended beyond the respective end of the housing.

1 Claim, 5 Drawing Figures

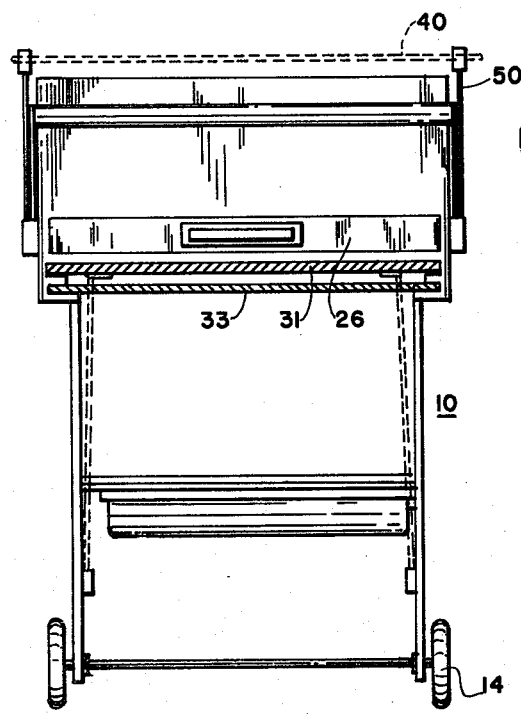
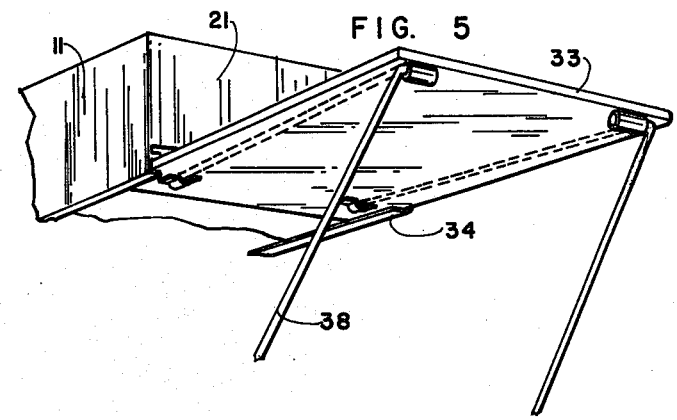
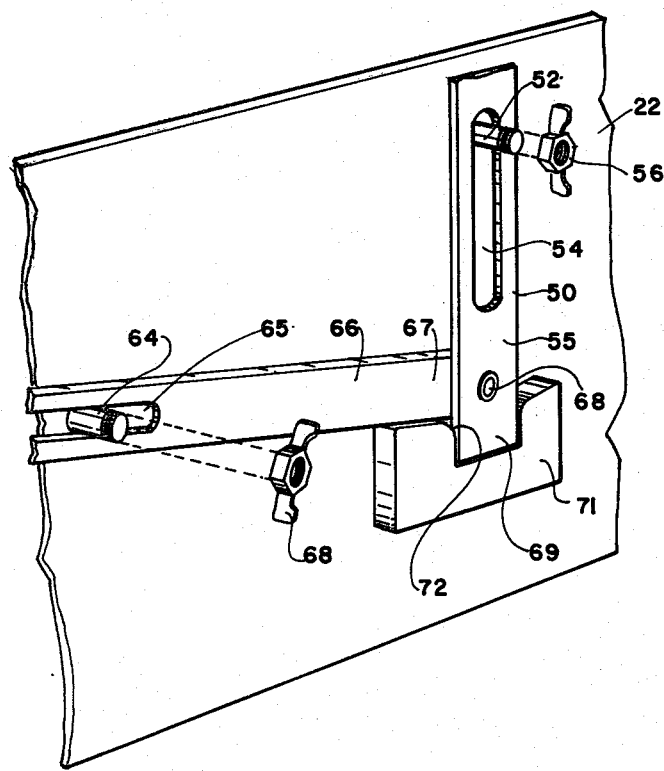

BARBECUE

SUMMARY OF THE INVENTION

My invention is a portable barbecue unit mounted on wheels in the form of a rectangular shaped housing, open to the top, with a grill detachably mounted on a pair of external vertically slidable members that are pivotally mounted to the handle structure extending from an end of the housing. The handle structure is pivotally mounted to the housing through slots in the handle arms so that the grill may be elevated by downward manual pressure on the handle and tilted as desired with respect to the horizontal plane. A slidable tray is mounted beneath a grate in the housing, with the tray serving to catch ashes. A pair of shelf members are slidably mounted to the bottom of the housing to form opposed shelves when each is extended beyond the respective end of the housing.

BRIEF DESCRIPTION OF THE DRAWINGS

The objects and features of the invention may be understood with reference to the following detailed description of an illustrative embodiment of the invention, taken together with the accompanying drawings in which:

FIG. 3 is a rear end view of the invention;
FIG. 4 is a detail perspective view of the handle and grill linkage;
and
FIG. 5 is a detail perspective view of a slidable tray.

DESCRIPTION OF THE PREFERRED EMBODIMENT

Figure 1:
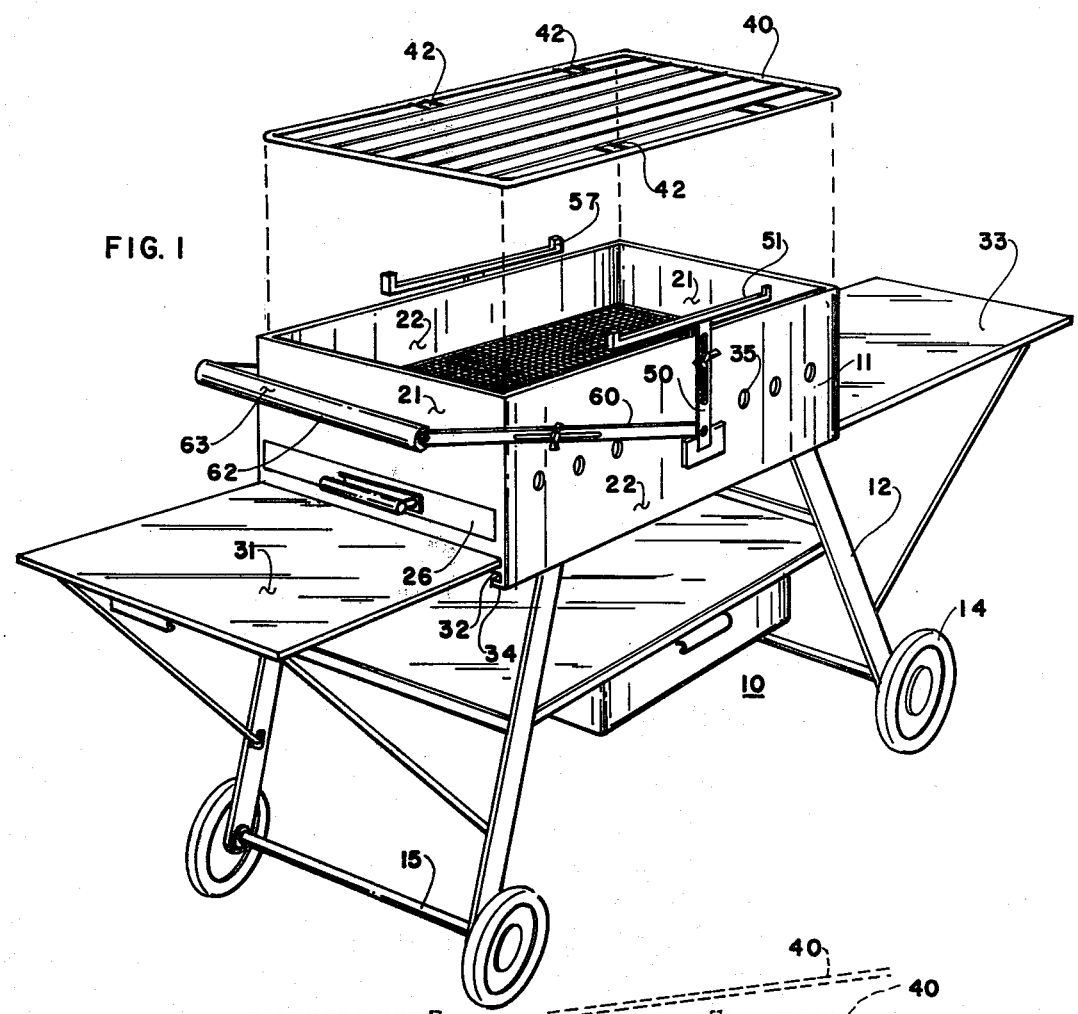
FIG. 1 is a perspective view of the invention.

Turning now descriptively to the drawings, in which similar reference characters denote similar elements throughout the several views, FIGS. 1-5 illustrate the barbecue unit 10 in the form of a rectangular box-shaped housing 11 mounted on four leg members 12, with a pair of wheels 14 fixed to an axle 15 rotatably mounted to each forward and each rear pair of leg members. Housing 11 is formed of a pair of opposed rectangular end plates 21 joined to opposed rectangular side plate 22 and with a solid rectangular shaped bottom plate 23 joined to the side and end plates.

An ash tray 26 is slidably mounted on the bottom plate 23 and may be slid through an opening in the front end plate 21 for removal of ashes. A grate is internally mounted above the ash tray 26, resting freely on internal ribs 27, on the housing internal surfaces, for support of fuel such as charcoal 28.

A first slidable shelf 31 is externally mounted below the bottom plate 23 on ribs 32 and a second shelf 33, mounted below first shelf 31, resting on ribs 34, with ribs 32 and 34 projecting internally from the lower section of the opposed side walls 22. Holes 35 in side walls 22 provide vents to the fire chamber in the housing.

Figure 2:
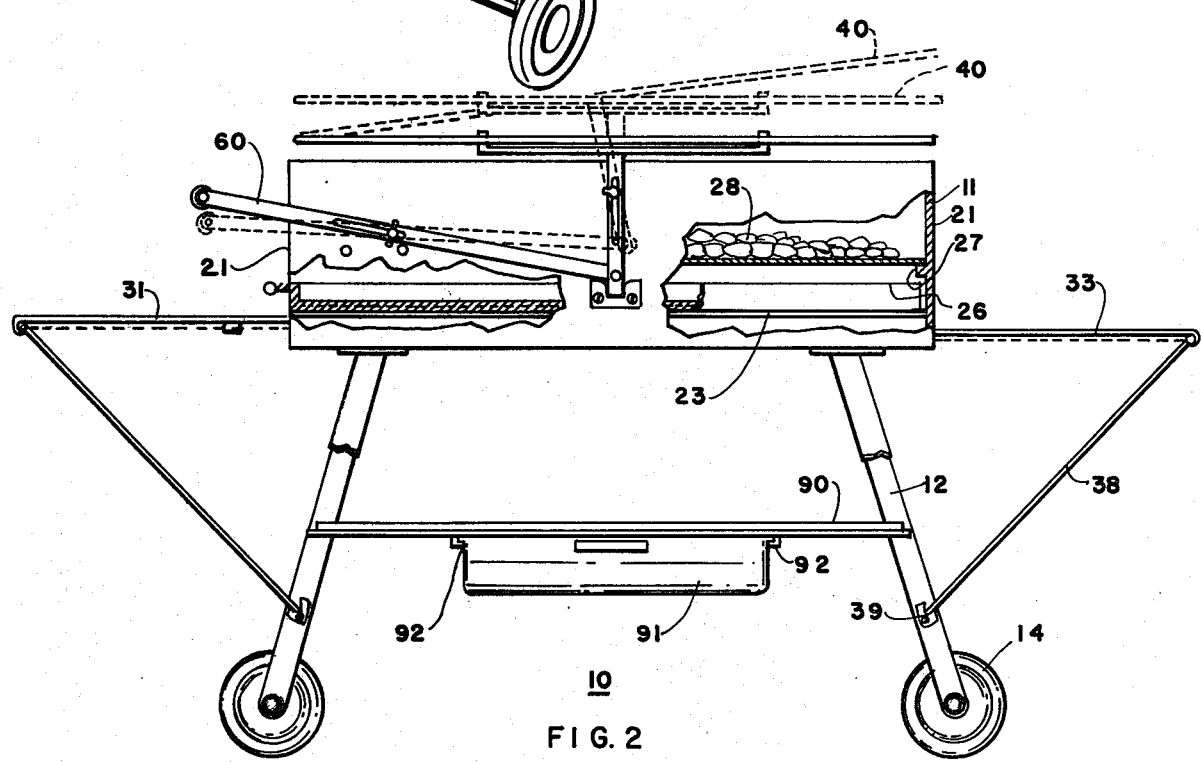
FIG. 2 is a side sectional view of the invention.

Strut members 38 are hinged to trays 31 and 33, which each individually latch onto brackets 39 on the leg members 12 to provide support when a shelf is extended, as shown in FIGS. 1-2 beyond an end plate 21.

A grill 40 is mounted above the top rim of the housing, with grill 40 resting freely on the opposed horizontal arm sections 51 of each of two T-shaped support members 50, with each support member 50 slidably, and pivotally mounted externally to a side plate 22 by means of a threaded stud 52 fixed to the side plate that extends through a vertical slot 54 in the vertical leg section 55 of the support member 50. A wing nut 56 is threaded to the stud 52 to hold the support member in fixed relation to the housing 11. Grill 40 is formed with a pair of spaced rectangular holes 42 adjacent each side which each nest about a vertical flange 57 that projects above the arm section 51 of the support member 50.

A rectangular U-shaped handle member 60, the mid-section 62 of which is covered by an insulated tubing 63, that serves as a grip, is pivotally mounted to the housing by threaded studs 64, each of which extends externally from a side plate 22, with each stud 64 extending through a slot 65 in a straight leg section 66 of the handle member 60 and with the end section 67 of each leg section 66 pivotally mounted by a rivet 68 to a lower section 69 of a vertical leg section 55 of a support member 50.

A bracket 71 is externally mounted to each side plate 22 and formed with a shaped recess 72 open to the top of a size to nest the lower side edges of the lower section 69 of support leg section 55 in the normal resting position of support member 50 and grill 40.

A wing nut 68 is threaded to stud 64. With nuts 68 and 56 loosened, the grill 40 may be elevated, by manual pressure on handle grip 63, above the top of housing 11, as shown by the dash lines of FIG. 2 to extend in either a horizontal plane at a desired height or to be inclined along a diagonal plane to the horizontal, as desired so as to apply greater heat to meat being barbecued on the lower portion of the grill 40. Nuts 68 and 56 may be tightened to hold handle unit 60 and grill 40 at a desired setting.

In the normal resting position of support member 50 handle unit 60 serves as a means of rolling of the entire unit 10 to a desired position on wheels 14.

A horizontal platform 90 is fixed to legs 12 below housing 11 and a drawer 91 is slidably mounted below platform 90 by L-shaped flanges 92 fixed to the underside of platform 90, with drawer 91 and platform 90 enclosing a compartment inside of drawer 91 for safe storage of food, prior to the use of the unit as a barbecue. Utensils may also be stored in drawer 91 or on top of platform 90.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A barbecue unit in the form of a housing mounted on support legs,
    said housing shaped as a rectangular box, open to the top, fitted with
    a grill detachably resting on pair of support members above the open top of the housing, with each support member externally slidably and pivotally mounted to an opposed side of the housing, and
    a pair of lever means, each pivotally and slidably mounted to an opposite side of the housing and each pivotally mounted to an individual support member, with both said lever means externally joined together by a handle, such that manual manipulation of said handle serves to pivot said lever means so as to elevate or lower the grill resting on the support members, and to also pivot said grill in a plane at a desired angle to the plane of the open top of the housing, together with fastener means to alternatively restrain or to free each support member with regard to motion of the support member with respect to the side of the housing to which it is slidably mounted.

* * * * *